US010191595B2

(12) United States Patent
Jeong et al.

(10) Patent No.: US 10,191,595 B2
(45) Date of Patent: Jan. 29, 2019

(54) ELECTRONIC DEVICE WITH PLURALITY OF MICROPHONES AND METHOD FOR CONTROLLING SAME BASED ON TYPE OF AUDIO INPUT RECEIVED VIA THE PLURALITY OF MICROPHONES

(71) Applicant: LG ELECTRONICS INC., Seoul (KR)

(72) Inventors: Gyuhyeok Jeong, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/476,821

(22) Filed: Mar. 31, 2017

(65) Prior Publication Data

US 2017/0322648 A1  Nov. 9, 2017

(30) Foreign Application Priority Data

May 3, 2016  (KR) .................. 10-2016-0054873

(51) Int. Cl.
G06F 3/043 (2006.01)
G06F 3/041 (2006.01)
G06F 3/16 (2006.01)
G10L 15/22 (2006.01)

(52) U.S. Cl.
CPC .......... G06F 3/043 (2013.01); G06F 3/0416 (2013.01); G06F 3/167 (2013.01); G10L 15/22 (2013.01); *G06F 2203/04106* (2013.01)

(58) Field of Classification Search
CPC ........ G06F 3/043; G06F 3/0416; G06F 3/167; G06F 2203/04106; G10L 15/22
See application file for complete search history.

(56) References Cited

U.S. PATENT DOCUMENTS

| 9,141,150 B1* | 9/2015 | Trundle ............... G06F 1/1694 |
| 2009/0197504 A1 | 8/2009 | Hsu |
| 2010/0010669 A1 | 1/2010 | Lee et al. |
| 2011/0084914 A1* | 4/2011 | Zalewski ............... G06F 3/043 345/173 |
| 2011/0096036 A1* | 4/2011 | McIntosh ............... G06F 3/043 345/177 |

(Continued)

FOREIGN PATENT DOCUMENTS

WO  2006070044  7/2006

OTHER PUBLICATIONS

PCT International Application No. PCT/KR2017/002679, Notification of Transmittal of the International Search Report and the Written Opinion of the International Searching Authority, or Declaration dated May 23, 2017, 13 pages.

*Primary Examiner* — Rodney Amadiz
(74) *Attorney, Agent, or Firm* — Lee, Hong, Degerman, Kang & Waimey

(57) ABSTRACT

An electronic device including a plurality of the microphones and operating method thereof are disclosed. The present invention includes obtaining an audio according to a touch input of touching at least one of a plurality of the microphones, determining at least one selected from the group consisting of a location, a touch pattern, a touch strength, a touch duration time and a touch periodicity of the touch input based on the obtained audio, and performing an operation corresponding to the touch input based on a result of the determination.

13 Claims, 17 Drawing Sheets

(56) References Cited

U.S. PATENT DOCUMENTS

| | | |
|---|---|---|
| 2014/0156269 A1 | 6/2014 | Lee et al. |
| 2014/0267575 A1* | 9/2014 | Eisenberg ............ H04N 7/152 |
| | | 348/14.09 |
| 2015/0138333 A1 | 5/2015 | DeVaul et al. |

* cited by examiner

FIG. 9
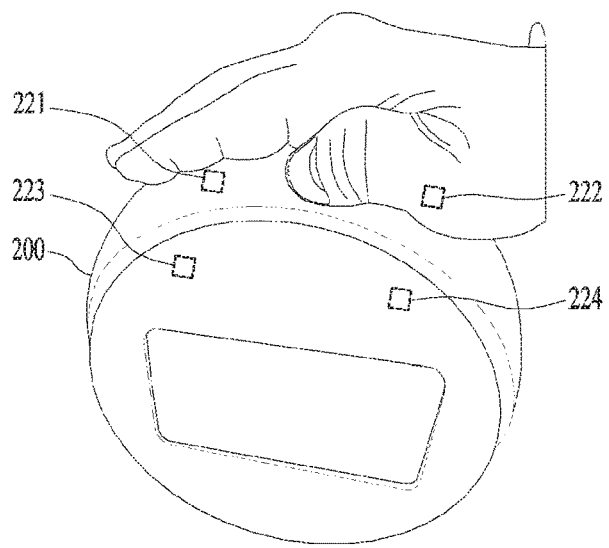
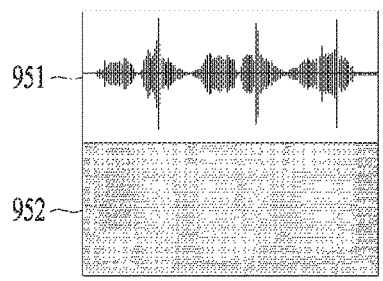
First microphone
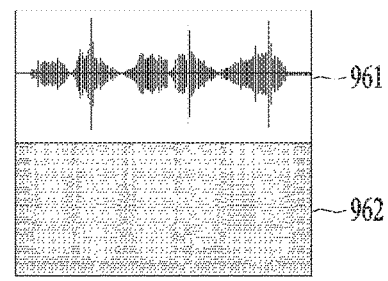
Second microphone
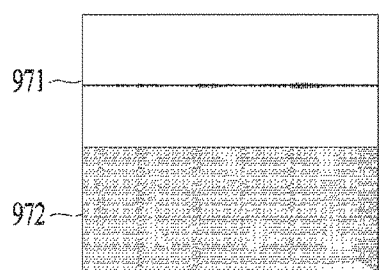
Third microphone
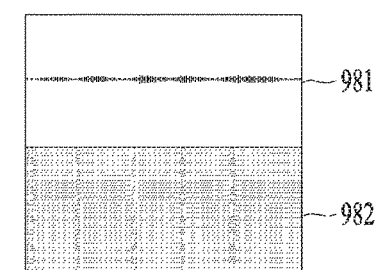
Fourth microphone FIG. 10
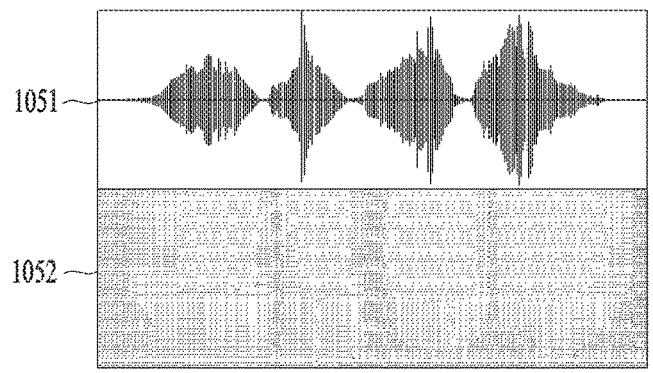
(a)
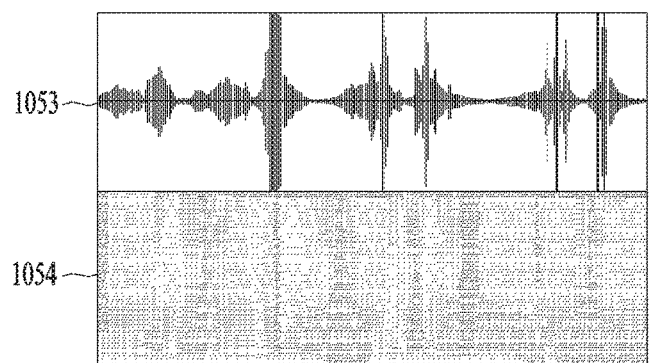
(b)
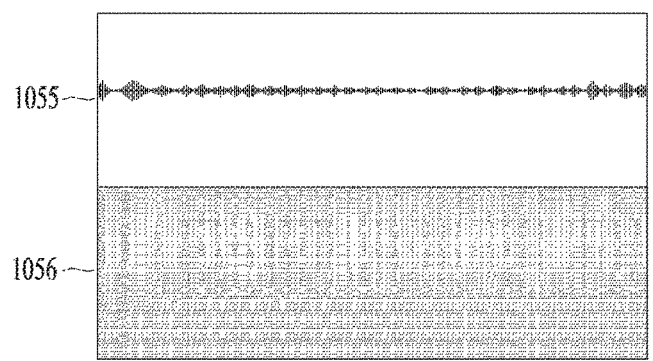
(c)

FIG. 11
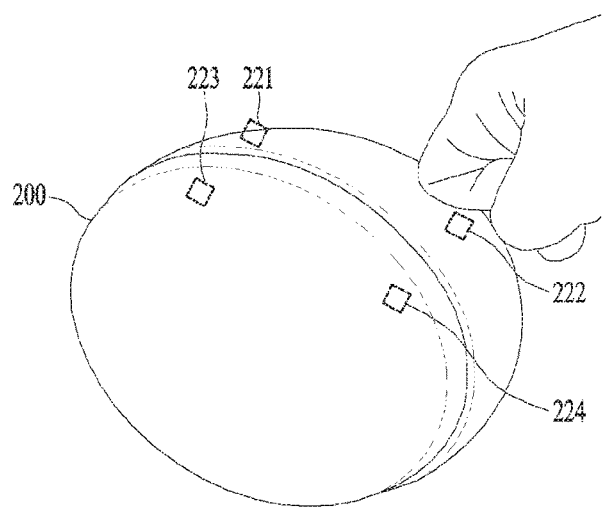
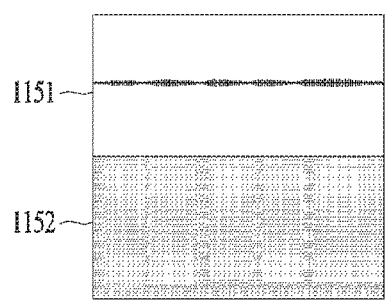
First microphone
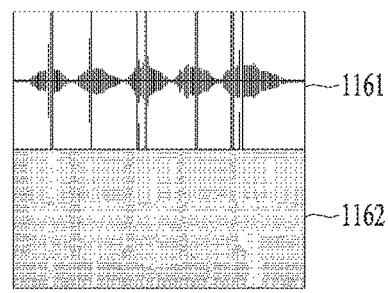
Second microphone
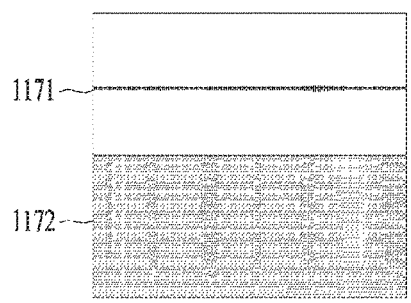
Third microphone
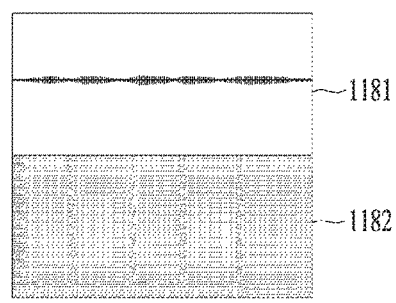
Fourth microphone FIG. 12
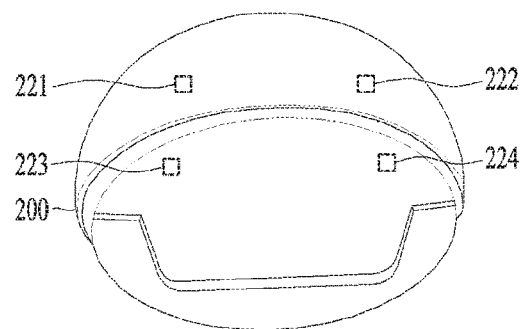
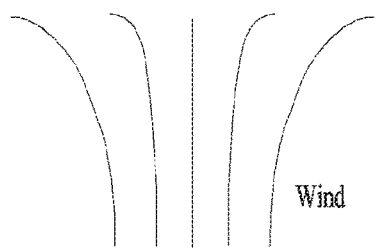
Wind
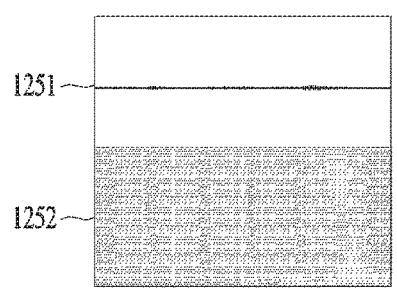
First microphone
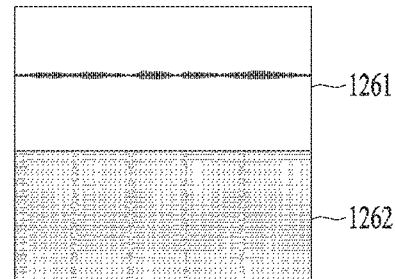
Second microphone
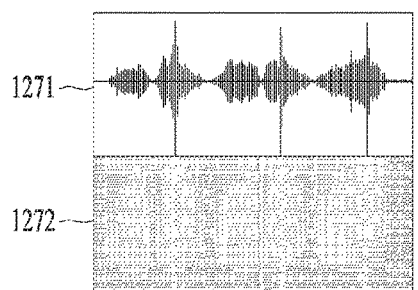
Third microphone
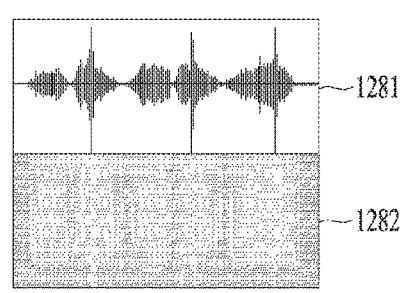
Fourth microphone FIG. 13
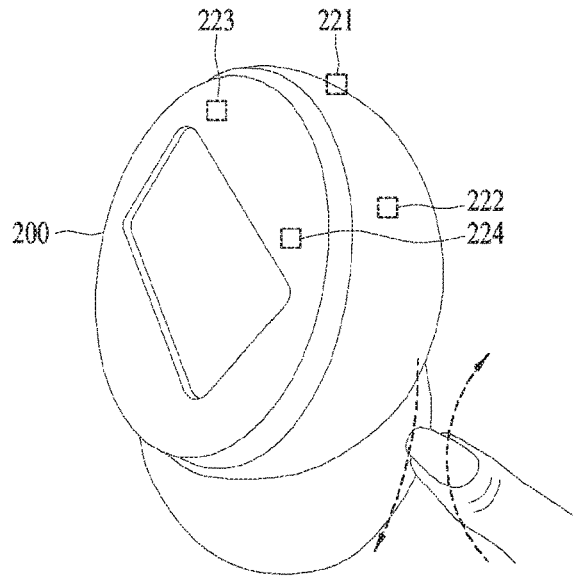
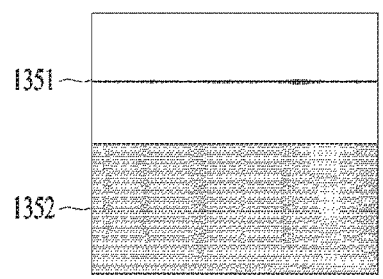
First microphone
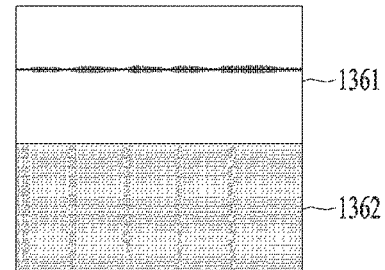
Second microphone
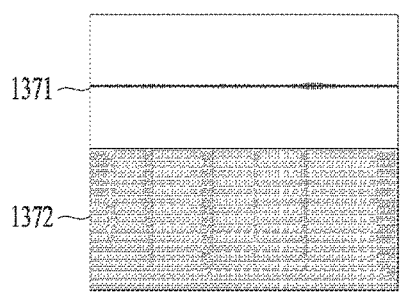
Third microphone
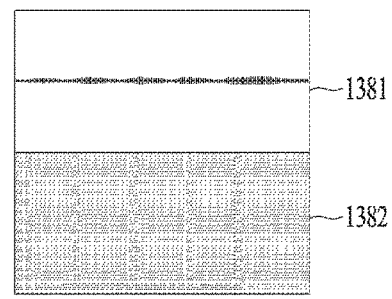
Fourth microphone

ELECTRONIC DEVICE WITH PLURALITY OF MICROPHONES AND METHOD FOR CONTROLLING SAME BASED ON TYPE OF AUDIO INPUT RECEIVED VIA THE PLURALITY OF MICROPHONES

Pursuant to 35 U.S.C. § 119(a), this application claims the benefit of earlier filing date and right of priority to Korean Application No. 10-2016-0054873, filed on May 3, 2016, the contents of which are all hereby incorporated by reference herein in their entirety.

BACKGROUND OF THE INVENTION

Field of the Invention

The present invention relates to an electronic device, and more particularly, to an electronic device and controlling method thereof. Although the present invention is suitable for a wide scope of applications, it is particularly suitable for performing a function based on various audios inputted through a microphone.

Discussion of the Related Art

A device configured to behave by making self-decision according to a predetermined rule is called a robot. The robot may mean a device configured to simply performing a prescribed operation for itself or a device configured to operate based on a recognized information by self-recognizing a situation or environment.

Thus, a robot has been already capable of behaving by making a behavior plan of high level enough to exclude human intervention owing to the development of artificial intelligence and is currently used for various fields.

As a voice recognition function has been developed, a robot recognizes user's voice, responds to the recognized voice, and performs a function or operation according to a voice command.

As such a robot is now used in an intimate space such as a home, such an input (e.g., a touch, etc.) for interaction with the robot is required. For such a touch input, a separate senor for recognizing a touch input is required for a robot. As a sensor is added, manufacturing costs, maintenance costs and the like are incurred additionally.

Therefore, the demand for a method of recognizing a touch input to an electronic device such as a robot without adding other sensors except a microphone for a voice recognition function essential to the electronic device is rising.

And, since both a speech input and a touch input may be simultaneously inputted, it is necessary for the speech input to be enabled in the course of applying the touch input.

SUMMARY OF THE INVENTION

Accordingly, embodiments of the present invention are directed to an electronic device and controlling method thereof that substantially obviate one or more problems due to limitations and disadvantages of the related art.

One object of the present invention is to provide an electronic device and controlling method thereof, by which a touch input can be recognized using a microphone.

Another object of the present invention is to provide an electronic device and controlling method thereof, by which a speech input for voice recognition can be obtained in the course of applying a touch to a microphone.

Accordingly, the present invention can recognize various inputs such as a speech input and a touch input using a microphone without a separate sensor module.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, an electronic device according to one embodiment of the present invention may include a plurality of microphones obtaining an audio according to a touch input of applying a touch and a controller configured to obtain an audio according to a touch input of touching at least one of a plurality of the microphones, determine at least one selected from the group consisting of a location, a touch pattern, a touch strength, a touch duration time and a touch periodicity of the touch input based on the obtained audio, and perform an operation corresponding to the touch input based on a result of the determination.

In another aspect of the present invention, as embodied and broadly described herein, an electronic device according to another embodiment of the present invention may include a plurality of the microphones and a controller configured to determine a touch input applied through at least one of a plurality of the microphones based on an audio obtained through at least one of a plurality of the microphones, obtain a voice command through at least one of a plurality of the microphones except the microphone corresponding to the touch input, and perform an operation corresponding to the obtained voice command.

In another aspect of the present invention, as embodied and broadly described herein, a method of operating an electronic device including a plurality of the microphones according to another embodiment of the present invention may include obtaining an audio according to a touch input of touching at least one of a plurality of the microphones, determining at least one selected from the group consisting of a location, a touch pattern, a touch strength, a touch duration time and a touch periodicity of the touch input based on the obtained audio, and performing an operation corresponding to the touch input based on a result of the determination.

In further aspect of the present invention, as embodied and broadly described herein, a method of operating an electronic device including a plurality of the microphones according to further embodiment of the present invention may include obtaining an audio through at least one of a plurality of the microphones, determining a touch input applied through at least one of a plurality of the microphones based on the obtained audio, obtaining a voice command through at least one of a plurality of the microphones except the microphone corresponding to the touch input, and performing an operation corresponding to the obtained voice command.

Accordingly, embodiments of the present invention provide various effects and/or features.

First of all, an electronic device according to an embodiment of the present invention can recognize various inputs such as a user's touch input using a microphone.

Secondly, the present invention can perform various operations or functions according to the recognized audio signal patterns.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 9 is a diagram of an audio signal pattern in response to a pat input according to one embodiment of the present invention;

FIG. 10 is a diagram of an audio signal pattern according to strength and duration time of an inputted audio signal of the present invention;

FIG. 11 is a diagram of an audio signal pattern in response to a tapping input according to one embodiment of the present invention;

FIG. 12 is a diagram of an audio signal pattern in response to a blowing input according to one embodiment of the present invention;

FIG. 13 is a diagram of an audio signal pattern in response to a rubbing input according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

An electronic device disclosed in the present specification may include a terminal such as a mobile phone, a smartphone, a laptop computer, a digital broadcast terminal, a PDA (personal digital assistants), PMP (portable multimedia player), a navigation, a slate PC, a tablet PC, a ultrabook, a wearable device (e.g., a smartwatch, a smart glass, a head mounted display) (HMD), etc.). An electronic device disclosed in the present specification may include a machine capable of autonomously processing or operating a prescribed job like a robot. The robot included in the electronic device described in the present specification may be a fixed type, a mount type, or a mobile type. And, the mobile-type robot may be configured to move autonomously.

Figure 1:
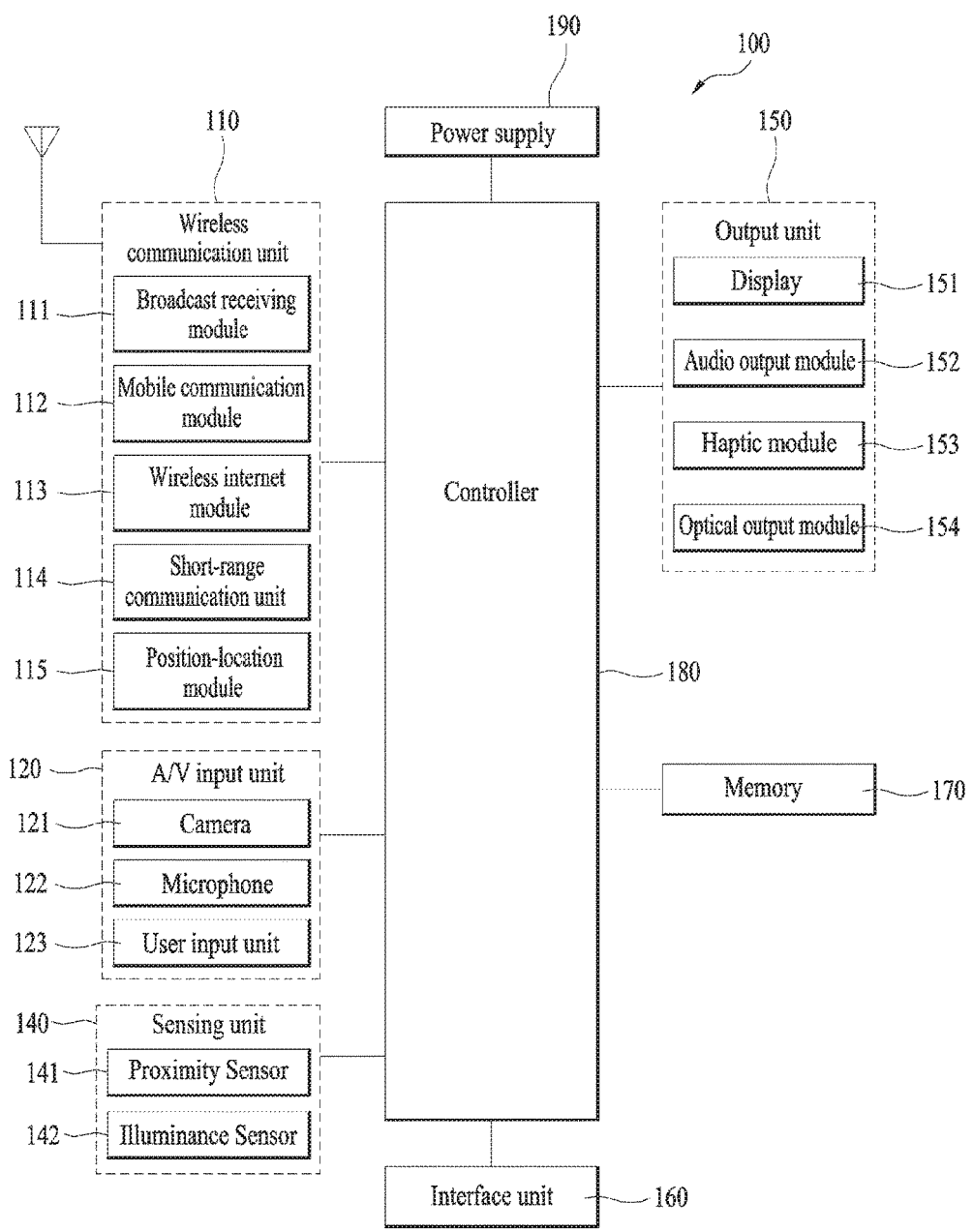
FIG. 1 is a block diagram to describe an electronic device in association with the present invention.

FIG. 1 is a block diagram to describe an electronic device in association with the present invention.

An electronic device 100 may include a wireless communication unit 110, an input unit 120, a sensing unit 140, an output unit 150, an interface unit 160, a memory 170, a controller 180, a power supply unit 190 and the like. As the components shown in FIG. 1 are not mandatory for implementation of the electronic device, the electronic device mentioned in the present specification may have components more or less than the above-listed components.

Particularly, the wireless communication unit 100 among the components may include at least one module capable of enabling a wireless communication between the electronic device 100 and a wireless communication system, between the electronic device 100 and another electronic device, or between the electronic device 100 and an external server. And, the wireless communication unit 110 may include at least one module configured to connect the electronic device 100 to at least one network.

The wireless communication unit 110 may include at least one of a broadcast receiving module 111, a mobile communication module 112, a wireless internet module 113, a short range communication module 114, a location information module 115 and the like.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the electronic device 100. The power supply unit 190 may include a battery, and the battery may be configured to be embedded in the electronic device body, or configured to be detachable from the electronic device body.

At least one portion of the above-mentioned components can cooperatively operate to implement operations, controls or controlling methods of the electronic device according to various embodiments mentioned in the following description. And, the operations, controls or controlling methods of the electronic device can be implemented on the electronic device by running at least one or more application programs saved in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the electronic device. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external electronic device, a server, and the like. Such network entities form part of a mobile communication network, which is constructed according to technical standards or communication methods for mobile communications (for example, Global System for Mobile Communication (GSM), Code Division Multi Access (CDMA), CDM2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, or communications between the electronic device and a network where another electronic device 100 (or an external server) is located, via wireless area networks. One example of the wireless area networks is a wireless personal area networks.

In some embodiments, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device.

As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the electronic device 100. The user input unit 123 may include one or more of a mechanical input element (for example, a key, a button located on a front and/or rear surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like. The controller 180 generally cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the electronic device 100. The power supply unit 190 may include a battery, which is typically rechargeable or be detachably coupled to the electronic device body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
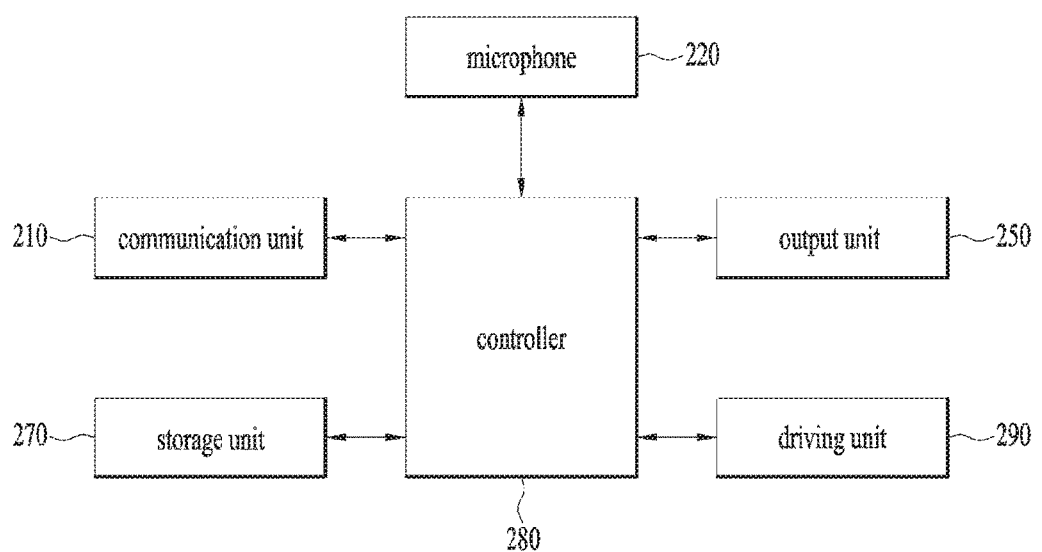
FIG. 2 is a block diagram for the configuration of an electronic device according to one embodiment of the present invention.

FIG. 2 is a block diagram for the configuration of an electronic device according to one embodiment of the present invention.

Referring to FIG. 2, an electronic device 200 may include a communication unit 210, a microphone 220, an output unit 250, a storage unit 270, a controller 280 and a driving unit 290. Some of the components included in the electronic device 200 may be removed or other components may be further included therein. The electronic device 200 may include the former electronic device 100, whereby some of the components of the former electronic device 100 may be included in the latter electronic device 200.

The communication unit 210 may include at least one module capable of enabling a wireless communication between the electronic device 200 and a wireless or wired communication system, between the electronic device 100 and another electronic device 100/200, or between the electronic device 200 and an external server. And, the communication unit 210 may correspond to the former wireless communication unit 110.

The microphone 200 processes a sound signal into an electric audio data. For instance, the microphone 200 can process an external sound signal into an audio signal corresponding to an electric audio data. As the microphone 220 can include a plurality of microphones, it is able to obtain equal or different sound signals through a plurality of the microphones, respectively. The microphone 220 may correspond to the former microphone 122.

The output unit 250 may include a display unit 251 configured to output an image or video and an audio output unit 252 configured to output an audio or sound.

The display unit 251 may display (or output) information processed by the electronic device 200. For example, the display unit 251 may display a running screen information of an application program currently run in the electronic device 200 or UI/GUI (user interface/graphic user interface) information according to the running screen information. And, the display unit 251 may correspond to the former display unit 151.

The audio output unit 252 may output various audio data. For instance, the audio output unit 252 may output an audio signal related to a function performed in the electronic device 200. And, the audio output unit 252 may correspond to the former audio output module 152.

The storage unit 270 can store data for supporting various functions of the electronic device 200. For instance, the storage unit 270 can store data for a function corresponding to a recognized voice or data for a function corresponding to an audio signal pattern. The storage unit 270 may correspond to the former memory 170.

The controller 280 may control an operation related to an application program and overall operations of the electronic device 200. For instance, the controller 280 can determine whether an obtained audio signal pattern corresponds to an audio according to a touch input and is also able to determine a function corresponding to the audio according to the touch input. If the controller 280 obtains an audio according to a touch input, it may activate a voice recognition function and launch a function corresponding to an obtained voice command. The controller 280 may include at least one processor and correspond to the former controller 180.

The driving unit 290 may drive the electronic device 200 to move. Hence, the electronic device 200 can move in response to the drive of the driving unit 290. For instance, the driving unit 290 may include at least one motor and drive the electronic device 200 to move by operating the included motor.

Figure 3:
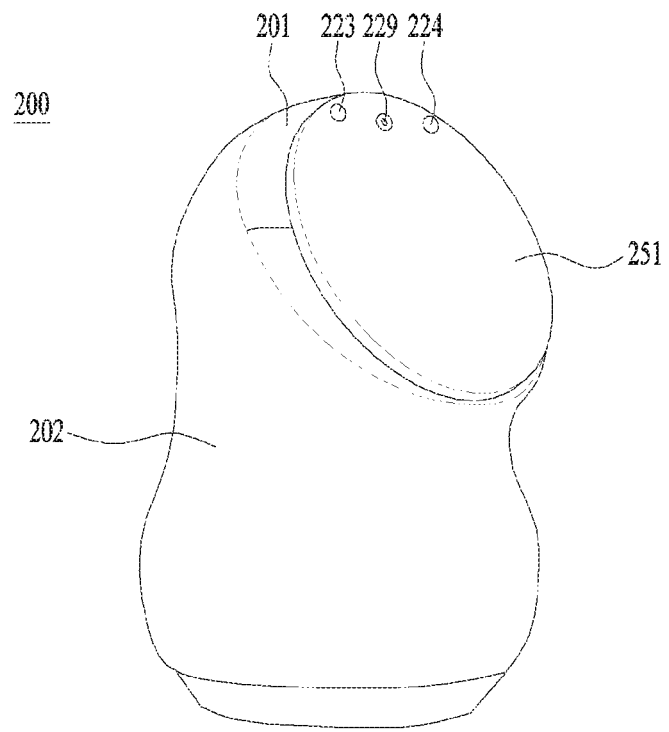
FIG. 3 is a perspective diagram of an electronic device according to one embodiment of the present invention.

FIG. 3 is a perspective diagram of an electronic device according to one embodiment of the present invention.

Referring to FIG. 3, an electronic device 200 may have a body of a curved cylindrical shape, by which the present invention may be non-limited. For example, the body may have a bar shape, an oval shape, a ball shape, an animal shape, a humanoid shape similar to a human shape, or the like.

The electronic device 200 may include at least one case (e.g., frame, housing, cover, etc.) configuring an exterior of the electronic device 200. For instance, the electronic device 200 may include a first case 201 of a top side and a second case 202 of a bottom side. Various electronic parts may be disposed in an inner space formed by coupling the first and second cases 201 and 202 together. The disposed electronic parts may include at least one of the aforementioned components.

A display unit 251 is disposed on a front side of the electronic device 200. A window of the display unit 251, as shown in the drawing, is installed in the first case 201 to configure a portion of a front side of the electronic device body together with the first case 201.

A camera 229 and a microphone 220 may be disposed on the front side of the electronic device 200. In this case, the microphone 220 may include a plurality of microphones 221 to 224. For instance, a third microphone 223 and a fourth microphone 224 can be disposed on the front side of the electronic device 200, while a first microphone 221 and a second microphone 222 can be disposed on the top side of the electronic device 200. This is described with reference to FIG. 4.

Figure 4:
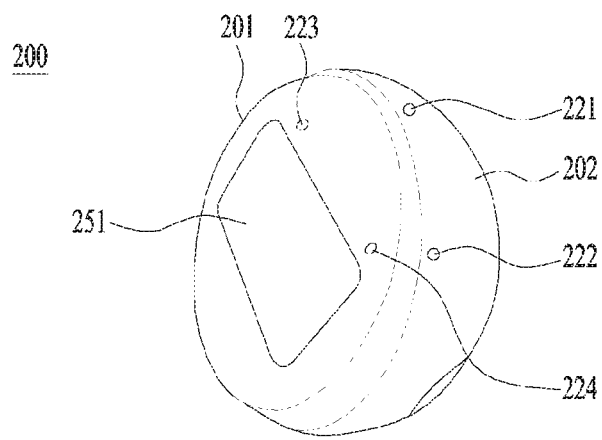
FIG. 4 is a perspective diagram for partial configuration of an electronic device according to one embodiment of the present invention.

FIG. 4 is a perspective diagram for partial configuration of an electronic device according to one embodiment of the present invention.

Referring to FIG. 4, the first and second microphones 221 and 222 can be disposed on the top side of the first case 201. And, the third and fourth microphones 223 and 224 can be disposed on the front side of the first case 201. Hence, the first and second microphones 221 and 222 may correspond to a top direction of the electronic device 200 and the third and fourth microphones 223 and 224 may correspond to a front direction of the electronic device 200.

Meanwhile, the configuration of a plurality of the microphones of the microphone 220 is provided as one example for the description, by which the present invention is non-limited. Hence, the microphone 220 can be disposed on various positions of the electronic device 200 and may include a plurality of microphones.

Figure 5:
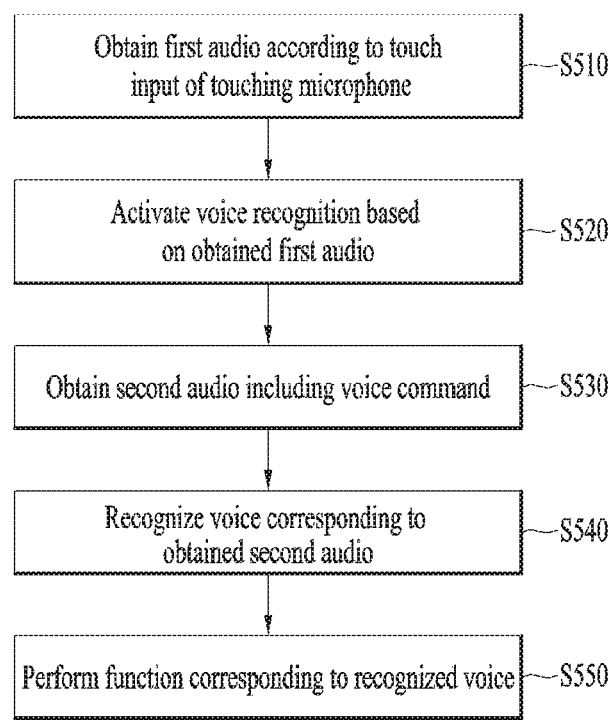
FIG. 5 is a flowchart for a method of controlling an electronic device according to various embodiments of the present invention.

FIG. 5 is a flowchart for a method of controlling an electronic device according to various embodiments of the present invention.

Referring to FIG. 5, the electronic device 200 can obtain a first audio according to a touch input of touching the microphone 220 [S510].

For instance, the controller 280 of the electronic device 200 can obtain the first audio corresponding to the audio according to a touch input of directly touching the microphone 220. In this case, the touch input of the directly touching the microphone 220 may include at least one of a proximity touch and a contact touch and may further include a touch of tapping the electronic device 200. Moreover, the electronic device 200 may obtain the first audio that is the audio according to an input of blowing a wind to the microphone 220, a touch input of coming in contact with the case of the electronic device 200 or the like as well as the touch input of directly touching the microphone 220. This shall be described later.

Based on the obtained first audio, the electronic device 200 can activate a voice recognition function [S520].

For instance, the controller 280 of the electronic device 200 can recognize the first audio according to the touch input of touching the microphone 220 as an audio signal for activating a voice recognition function. Hence, the controller 280 can activate the voice recognition function and recognize a voice obtained thereafter.

The electronic device 200 may recognize a first audio, which is an audio according to an input of blowing a wind to the microphone 220 or a touch input of coming in contact with the case of the electronic device 200, as an audio signal for activating a voice recognition function as well as an audio according to a touch input of directly touching the microphone 220.

The electronic device 200 can obtain a second audio including a voice command [S530].

For instance, after the activation of the voice recognition function, the controller 280 of the electronic device 200 can obtain a second audio including a voice command through the microphone 220. In this case, the voice command may include a user voice for controlling the electronic device 200 or executing a prescribed function of the electronic device 200.

The electronic device 200 can recognize a voice corresponding to the obtained second audio [S540].

For instance, the controller 280 of the electronic device 200 can recognize a voice included in the obtained second audio. The controller 280 can recognize the voice included in the second audio using various schemes. For example, the controller 280 coverts the obtained second audio into a text by TTS (text to speech) and is able to recognize the voice included in the second audio by recognizing the converted text.

The electronic device 200 can performs a function corresponding to a recognized voice [S550].

As a function corresponding to a recognized voice, the controller 280 of the electronic device 200 can perform at least one of various functions that can be performed by the electronic device 200. For instance, in response to a recognized voice, the electronic device 200 can control itself or another electronic device 200. For another instance, the electronic device 200 can output an answer to a question corresponding to a recognized voice. For further instance, as a function corresponding to a recognized voice, the electronic device 200 may perform at least one function by moving.

The electronic device 200 according to various embodiments of the present invention includes a plurality of microphones 220, obtains a first audio according to a touch input of touching a microphone through one of the microphones 220, and may be then able to obtain a second audio including a voice command through the rest of the microphones 200. This shall be described as follows.

Figure 6:
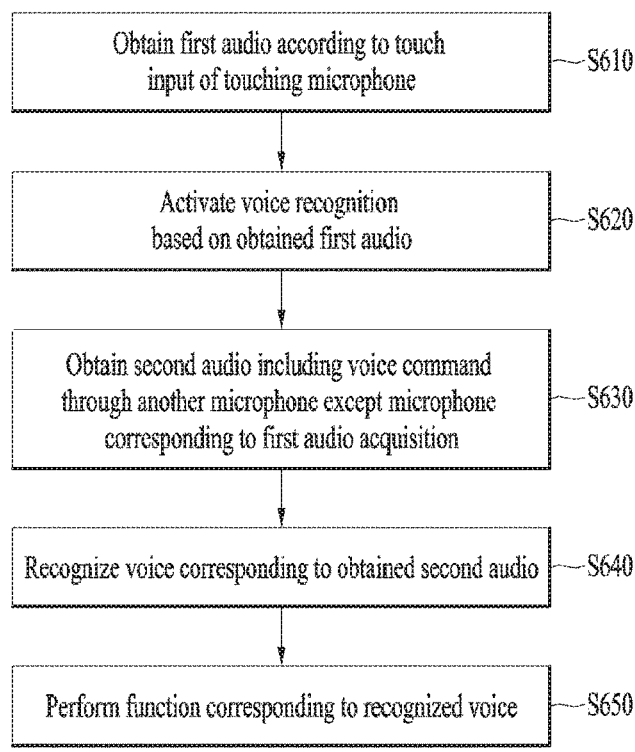
FIG. 6 is a flowchart for a method of controlling an electronic device according to various embodiments of the present invention.

FIG. 6 is a flowchart for a method of controlling an electronic device according to various embodiments of the present invention.

Referring to FIG. 6, the electronic device 200 can obtain a first audio according to a touch input of touching at least one of a plurality of the microphones 220 [S610].

For instance, the controller 280 of the electronic device 200 can obtain the first audio corresponding to the audio according to a touch input of directly touching at least one of a plurality of the microphones 220. Moreover, the electronic device 200 may obtain the first audio that is the audio according to an input of blowing a wind to at least one of a plurality of the microphones 220, a touch input of coming in contact with the case of the electronic device 200 or the like as well as the touch input of directly touching at least one of a plurality of the microphones 220. This is already mentioned in the foregoing description.

Based on the obtained first audio, the electronic device 200 can activate a voice recognition function [S620].

For instance, the controller 280 of the electronic device 200 can recognize the first audio according to the touch input of touching the microphone 220 as an audio signal for activating a voice recognition function. As mentioned in the foregoing description, the electronic device 200 may recognize a first audio, which is an audio according to an input of blowing a wind to the microphone 220 or a touch input of coming in contact with the case of the electronic device 200, as an audio signal for activating a voice recognition function as well as an audio according to a touch input of directly touching the microphone 220.

The electronic device 200 can obtain a second audio including a voice command through another microphone except the microphone corresponding to the first audio acquisition among a plurality of the microphones [S630].

For instance, after the activation of the voice recognition function, the controller 280 of the electronic device 200 can obtain a second audio including a voice command through another microphone 220 except the microphone 220 corresponding to the first audio acquisition. In this case, the voice command may include a user voice for controlling the electronic device 200 or executing a prescribed function of the electronic device 200.

The electronic device 200 can recognize a voice corresponding to the obtained second audio [S640].

For instance, the controller 280 of the electronic device 200 can recognize a voice included in the obtained second audio. The controller 280 can recognize the voice included in the second audio using various schemes.

The electronic device 200 can performs a function corresponding to a recognized voice [S650].

As a function corresponding to a recognized voice, the controller 280 of the electronic device 200 can perform at least one of various functions that can be performed by the electronic device 200. This is already mentioned in the foregoing description.

Thus, the electronic device 200 according to various embodiments of the present invention can obtain the second audio including the voice command through another microphone 220 except the microphone 220 for obtaining the first audio according to the touch input among a plurality of the microphones 220, thereby obtaining a voice command in the course of the touch input of directly touching the microphone 220. Therefore, the electronic device 200 according to the present invention can activate and use a voice input function in the course of directly touching the microphone.

The above embodiment is described in detail with reference to FIG. 7 as follows.

Figure 7:
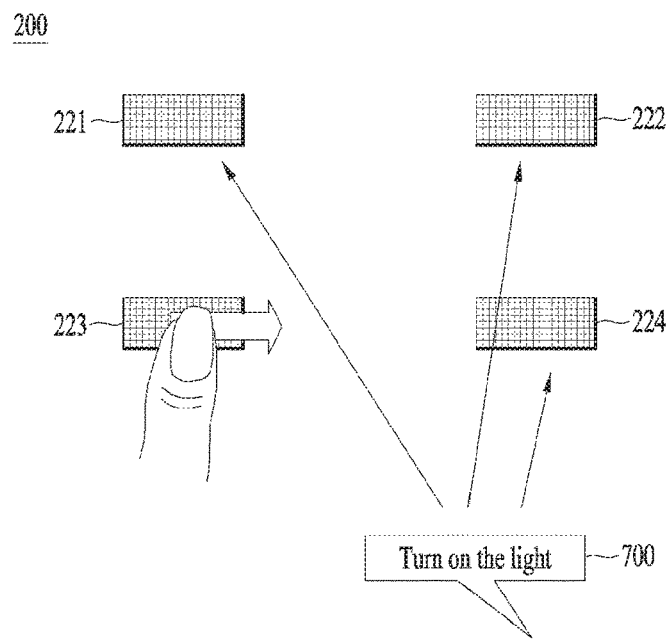
FIG. 7 is a diagram for the concept of audio acquisition according to various embodiments of the present invention.

FIG. 7 is a diagram for the concept of audio acquisition according to various embodiments of the present invention.

Referring to FIG. 7, an electronic device 200 can include a plurality of microphones 220 such as a first microphone 221, a second microphone 222, a third microphone 223 and a fourth microphone 224.

In the course of obtaining a first audio according to a touch input of touching the third microphone 223, the electronic device 200 can obtain a second audio 700 including a voice command 'Turn on the light' through at least one of the first to fourth microphones 221 to 224. Hence, the electronic device 200 activates a voice recognition function in response to the first audio according a touch input of touching the third microphone 223 and is then able to perform a function of turning a light by obtaining the second audio 700 including the voice command 'Turn on the light'.

The electronic device 200 according to various embodiments of the present invention recognizes an audio signal pattern of an audio obtained through the microphone 220 and is then able to perform a function according to the recognized pattern. If the recognized audio signal pattern fails to match a pre-saved audio signal pattern, the electronic device 200 learns a function corresponding to the recognized audio signal pattern and is then able to save the learned function in a manner of matching the learned function to the recognized audio signal pattern. Hence, the electronic device 200 learns the function according to the audio signal pattern and is able to perform the function according to the learned audio signal pattern. This is described in detail as follows.

Figure 8:
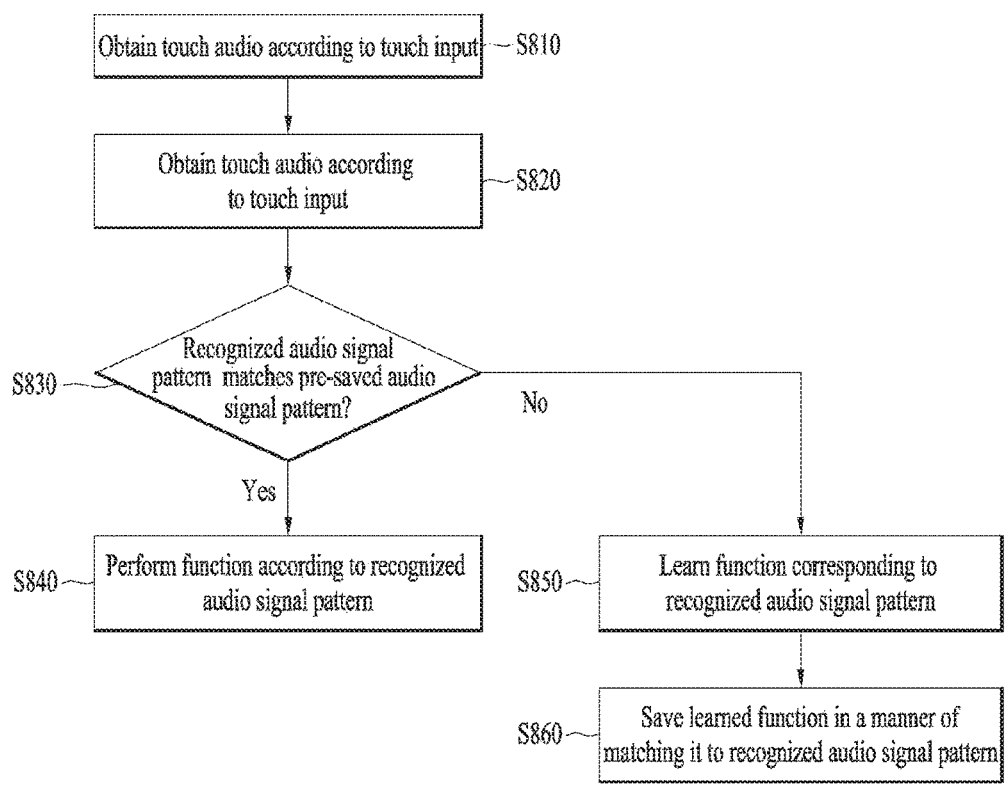
FIG. 8 is a flowchart for a method of controlling an electronic device according to various embodiments of the present invention.

FIG. 8 is a flowchart for a method of controlling an electronic device according to various embodiments of the present invention.

Referring to FIG. 8, the electronic device 200 can obtain a touch audio according to a touch input of touching the microphone 220 [S810].

In this case, the touch audio may correspond to the aforementioned first audio.

For instance, the controller 280 of the electronic device 200 can obtain the touch audio corresponding to the audio according to a touch input of directly touching the microphone 220. In this case, the touch input of the directly touching the microphone 220 may include at least one of a proximity touch and a contact touch and may further include a touch of tapping the electronic device 200. Moreover, the electronic device 200 may obtain the touch audio that is the audio according to an input of blowing a wind to the microphone 220, a touch input of coming in contact with the case of the electronic device 200 or the like as well as the touch input of directly touching the microphone 220.

The electronic device 200 can recognize an audio signal pattern of the obtained touch audio [S820].

For instance, the controller 280 of the electronic device 200 can recognize an audio signal pattern of the obtained touch audio. In this case, the audio signal pattern may include at least one of a shape of an audio signal, a size of an audio signal, a periodicity of an audio signal and an interval of an audio signal. The audio signal pattern may include a presence or non-presence of an input of an audio signal over a predetermined size and an input signal of the audio signal over the predetermined size. The audio signal pattern may include at least one of a location, a touch pattern, a touch strength, a touch duration time and a touch periodicity of a touch input of a touch audio. And, the audio signal pattern may include a location of the microphone 200, to which the touch audio is inputted, among a plurality of the microphones.

Meanwhile, the audio signal can be represented in various shapes. For instance, the audio signal may be represented in shape of a time-axis waveform, a frequency-axis waveform, or the like.

The electronic device 200 can determine whether the recognized audio signal pattern matches a pre-saved audio signal pattern [S830].

For instance, the controller 280 of the electronic device 200 can determine whether the recognized audio signal pattern matches an audio signal pattern stored in the storage unit 270 or an external server (not shown in the drawing). When the controller 280 determines whether the recognized audio signal pattern matches the pre-saved audio signal pattern, if the recognized audio signal pattern matches the pre-saved audio signal pattern at a predetermined rate or higher, the controller 280 can determine that the recognized audio signal pattern is identical to the pre-saved audio signal pattern.

If the recognized audio signal pattern is identical to the pre-saved audio signal pattern, the electronic device 200 can perform a function according to the recognized audio signal pattern [S840].

For instance, if the recognized audio signal pattern is identical to the pre-saved audio signal pattern, the controller 280 of the electronic device 200 can perform a function corresponding to the saved audio signal pattern identical to the recognized audio signal pattern as a function according to the recognized audio signal pattern.

If the recognized audio signal pattern fails to match the pre-saved audio signal pattern, the electronic device 200 can learn a function corresponding to the recognized audio signal pattern [S850].

For instance, the controller 280 of the electronic device 200 can obtain an input for setting the function corresponding to the recognized audio signal pattern and is able to learn a set function as the function corresponding to the recognized audio signal pattern.

For another instance, the controller 280 of the electronic device 200 may learn a currently run function or a function corresponding to an operation as the function corresponding to the recognized audio signal pattern.

For further instance, the controller 280 of the electronic device 200 may learn a function or operation of the electronic device 200, which is executed by a user after the recognized audio signal pattern, as the function corresponding to the recognized audio signal pattern.

The electronic device 200 can save the learned function in a manner of matching the learned function to the recognized audio signal pattern.

The controller 280 of the electronic device 200 can save at least one of the learned function (e.g., a currently run function, a function corresponding to an operation, etc.) and the user-executed function or operation of the electronic device in a manner of matching the function or operation to the recognized audio signal pattern.

For instance, the controller 280 can save the learned function to at least one of the storage unit 270 and an external server (not shown in the drawing) in a manner of matching it to the recognized audio signal pattern.

Hence, thereafter, if the audio signal pattern corresponding to the learned function is recognized, the electronic device 200 can perform the function corresponding to the recognized audio signal pattern.

The audio signal pattern recognition and the execution of a function corresponding to a recognized audio signal pattern according to the present invention are described as follows.

FIG. 9 is a diagram of an audio signal pattern in response to a pat input according to one embodiment of the present invention.

Referring to an upper part of FIG. 9, the electronic device 200 can obtain an audio according to an input of patting the first case 201 on which the first microphone 221 and the second microphone 222 are disposed. For one example, each of the first to fourth microphones 221 to 224 as a plurality of the microphones 220 provided to the electronic device 200 can obtain an audio according to the pat input. And, the controller 280 can create an audio signal pattern for an audio obtained by each of the first to fourth microphones 221 to 224. For instance, the controller 280 can create an audio signal pattern for the audio, which is obtained by each of the first to fourth microphones 221 to 224, on each of a time axis and a frequency axis. Hence, referring to a lower part of FIG. 9, the controller 280 can create a time-axis audio signal waveform 951 and a frequency-axis audio signal waveform 952 according to the audio obtained by the first microphone 221. And, the controller 280 can create a time-axis audio signal waveform 961 and a frequency-axis audio signal waveform 962 according to the audio obtained by the second microphone 222, a time-axis audio signal waveform 971 and a frequency-axis audio signal waveform 972 according to the audio obtained by the third microphone 223, and a time-axis audio signal waveform 981 and a frequency-axis audio signal waveform 982 according to the audio obtained by the fourth microphone 224. And, the controller 280 can recognize the audio signal pattern of the created audio signal waveforms. For instance, the controller 280 can recognize that each of the audio signal waveforms 951, 952, 961 and 962 of the first microphone 221 and the second microphone 222 is the audio signal pattern according to the input of patting a case portion near the corresponding microphone. In particular, the controller 280 can recognize that the audio signal waveform is the pattern according to an input of patting the case portion with weak strength in a predetermined interval based on a pattern of a clipping occurrence for a time shorter than a predetermined reference time. And, the controller 280 recognizes that the audio signal waveforms 971, 972, 981 and 982 of the audio signals obtained by the third microphone 223 and the fourth microphone 224 almost have no change, thereby recognizing that there is no touch input to each of the third microphone 223 and the fourth microphone 224. The electronic device 200 can perform a function according to the audio signal pattern of the pat input. For instance, as a function of an audio signal pattern of a pat input, the controller 280 may output an appreciation expression for compliment or launch a specific application.

The electronic device 200 according to the present invention may recognize an audio signal pattern according to a touch strength and a touch duration time extent of a touch input to the microphone 220. Depending on a touch strength and duration time extent of a recognized audio signal pattern, the electronic device 200 can perform a function according to the recognized audio signal pattern. This is described as follows.

FIG. 10 is a diagram of an audio signal pattern according to strength and duration time of an inputted audio signal of the present invention.

Referring to FIG. 10(*a*), the electronic device 200 can create a time-axis audio signal waveform 1051 and a frequency-axis audio signal waveform 1052 according to a pat input and is able to recognize a strength and duration time of the pat input based on a signal strength and periodicity of each of the created time-axis audio signal waveform 1051 and the created frequency-axis audio signal waveform 1052. If the electronic device 200 recognizes that the recognized strength and duration time of the pat input are appropriate, it is able to output an appreciation expression for compliment or launch a specific application.

Referring to FIG. 10(*b*), the electronic device 200 can create a time-axis audio signal waveform 1053 and a frequency-axis audio signal waveform 1054 according to a pat input and is able to recognize a strength and duration time of the pat input based on a signal strength and periodicity of each of the created time-axis audio signal waveform 1053 and the created frequency-axis audio signal waveform 1054. If the electronic device 200 recognizes that the recognized strength of the pat input is strong, it is able to output a response indicating that the pat input is strong and may launch a specific application.

Referring to FIG. 10(c), the electronic device 200 can create a time-axis audio signal waveform 1055 and a frequency-axis audio signal waveform 1056 according to a pat input and is able to recognize a strength and duration time of the pat input based on a signal strength and periodicity of each of the created time-axis audio signal waveform 1055 and the created frequency-axis audio signal waveform 1056. If the electronic device 200 recognizes that the recognized duration time of the pat input is long, it is able to output a response indicating that a compliment according to the pat input is long and may launch a specific application.

Thus, the electronic device 200 according to the present invention can recognize a strength and touch duration time of a touch input to the microphone 220.

And, the electronic device 200 can obtain audios according to various inputs as well as a direct touch input and recognize an audio signal pattern according to the obtained audio.

FIG. 11 is a diagram of an audio signal pattern in response to a tapping input according to one embodiment of the present invention.

Referring to an upper part of FIG. 11, the electronic device 200 can obtain an audio according to an input of tapping the first case 201 on which the first microphone 221 and the second microphone 222 are disposed. For one example, each of the first to fourth microphones 221 to 224 as a plurality of the microphones 220 provided to the electronic device 200 can obtain an audio according to the tapping input. And, the controller 280 can create an audio signal pattern for an audio obtained by each of the first to fourth microphones 221 to 224. For instance, the controller 280 can create an audio signal pattern for the audio, which is obtained by each of the first to fourth microphones 221 to 224, on each of a time axis and a frequency axis. Hence, referring to a lower part of FIG. 11, the controller 280 can create a time-axis audio signal waveform 1151 and a frequency-axis audio signal waveform 1152 according to the audio obtained by the first microphone 221. And, the controller 280 can create a time-axis audio signal waveform 1161 and a frequency-axis audio signal waveform 1162 according to the audio obtained by the second microphone 222, a time-axis audio signal waveform 1171 and a frequency-axis audio signal waveform 1172 according to the audio obtained by the third microphone 223, and a time-axis audio signal waveform 1181 and a frequency-axis audio signal waveform 1182 according to the audio obtained by the fourth microphone 224. And, the controller 280 can recognize the audio signal pattern of the created audio signal waveforms. For instance, the controller 280 can recognize that the audio signal waveforms 1161 and 1162 obtained by the second microphone 222 are the audio signal pattern according to the input of tapping a case portion near the corresponding microphone. In particular, the controller 280 can recognize that the audio signal waveform is the pattern according to an input of tapping the case portion in a predetermined interval based on a pattern of clippings occurring over a predetermined count for a time shorter than a predetermined reference time. And, the controller 280 recognizes that the audio signal waveforms 1151, 1152, 1171, 1172, 1181 and 1182 of the audio signals obtained by the first microphone 221, the third microphone 223 and the fourth microphone 224 almost have no change (e.g., white noise characteristic), thereby recognizing that there is no touch input to each of the first microphone 221, the third microphone 223 and the fourth microphone 224. Hence, the electronic device 200 can recognize that the tapping input was inputted to a location corresponding to the second microphone 22. And, the electronic device 200 can perform a function according to the audio signal pattern of the tapping input. For instance, as a function of an audio signal pattern of a tapping input, the controller 280 may move a direction faced by a front part of the electronic device 200 or output an expression of a response to a scolding. For another instance, as a function according to a pattern combination of a tapping input, the controller 180 may lock or unlock a locked state of the electronic device 200.

FIG. 12 is a diagram of an audio signal pattern in response to a blowing input according to one embodiment of the present invention.

Referring to an upper part of FIG. 12, the electronic device 200 can obtain an audio according to an input of blowing a wind to a front part of the electronic device 200. For one example, each of the first to fourth microphones 221 to 224 as a plurality of the microphones 220 provided to the electronic device 200 can obtain an audio according to the blowing input. And, the controller 280 can create an audio signal pattern for an audio obtained by each of the first to fourth microphones 221 to 224. For instance, the controller 280 can create an audio signal pattern for the audio, which is obtained by each of the first to fourth microphones 221 to 224, on each of a time axis and a frequency axis. Hence, referring to a lower part of FIG. 12, the controller 280 can create a time-axis audio signal waveform 1251 and a frequency-axis audio signal waveform 1252 according to the audio obtained by the first microphone 221. And, the controller 280 can create a time-axis audio signal waveform 1261 and a frequency-axis audio signal waveform 1262 according to the audio obtained by the second microphone 222, a time-axis audio signal waveform 1271 and a frequency-axis audio signal waveform 1272 according to the audio obtained by the third microphone 223, and a time-axis audio signal waveform 1281 and a frequency-axis audio signal waveform 1282 according to the audio obtained by the fourth microphone 224. And, the controller 280 can recognize audio signal patterns of the created audio signal waveforms. For instance, the controller 280 can recognize that the audio signal waveforms 1271, 1272, 1281 and 1282 of the audios obtained by the third microphone 223 and the fourth microphone 224 are the audio signal pattern according to the input of blowing a wind in the microphone direction. In particular, the controller 280 can recognize that the audio signal waveform is the pattern according to an input of blowing a wind in a predetermined interval based on a pattern of an occurrence of clipping for a time shorter than a predetermined reference time. And, the controller 280 recognizes that the audio signal waveforms 1251, 1252, 1261 and 1262 of the audio signals obtained by the first microphone 221 and the second microphone 222 almost have no change (e.g., white noise characteristic), thereby recognizing that the input of blowing a wind not in a direction of a top side having the first and second microphones 221 and 222 disposed thereon but in a front direction of the electronic device 200. And, the electronic device 200 can perform a function according to the audio signal pattern of the blowing input. For instance, as a function of an audio signal pattern of a blowing input, the controller 280 may send a message or turn on/off a power. Moreover, the controller 280 may output an expression of a response to the blowing input.

FIG. 13 is a diagram of an audio signal pattern in response to a rubbing input according to one embodiment of the present invention.

Referring to an upper part of FIG. 13, the electronic device 200 can obtain an audio according to an input of rubbing a lateral side of the electronic device 200. For one example, each of the first to fourth microphones 221 to 224 as a plurality of the microphones 220 provided to the electronic device 200 can obtain an audio according to the input of rubbing a case portion of the electronic device 200. And, the controller 280 can create an audio signal pattern for an audio obtained by each of the first to fourth microphones 221 to 224. For instance, the controller 280 can create an audio signal pattern for the audio, which is obtained by each of the first to fourth microphones 221 to 224, on each of a time axis and a frequency axis. Hence, referring to a lower part of FIG. 13, the controller 280 can create a time-axis audio signal waveform 1351 and a frequency-axis audio signal waveform 1352 according to the audio obtained by the first microphone 221. And, the controller 280 can create a time-axis audio signal waveform 1361 and a frequency-axis audio signal waveform 1362 according to the audio obtained by the second microphone 222, a time-axis audio signal waveform 1371 and a frequency-axis audio signal waveform 1372 according to the audio obtained by the third microphone 223, and a time-axis audio signal waveform 1381 and a frequency-axis audio signal waveform 1382 according to the audio obtained by the fourth microphone 224. And, the controller 280 can recognize audio signal patterns of the created audio signal waveforms. For instance, the controller 280 can recognize that the audio signal waveforms 1371, 1372, 1381 and 1382 of the audios obtained by the second microphone 222 and the fourth microphone 224 are the audio signal pattern according to the input of rubbing the case in direction corresponding to the second microphone 222 and the fourth microphone 224. In particular, based on a fact that the audio signal waveforms 1361, 1362, 1381 and 1382 of the audios obtained by the second microphone 222 and the fourth microphone 224 almost have no change (e.g., white noise characteristic) and a fact that the audio signal waveforms 1351, 1352, 1371 and 1372 of the audios obtained by the first microphone 221 and the third microphone 223 almost have no shape, the controller 280 can recognize that it is the audio signal pattern according to the input of rubbing the case in the direction corresponding to the second microphone 222 and the fourth microphone 224. And, the electronic device 200 can perform a function according to the audio signal pattern of the input of rubbing the case. For instance, as a function of an audio signal pattern of a rubbing input, the controller 280 can output an expression of a response to the rubbing input and launch a specific application.

The electronic device 200 according to the present invention determines a user corresponding to a touch audio according to a touch input and is able to perform a function corresponding to the determined user. Moreover, the electronic device 200 may perform a function corresponding to a touch audio in consideration of a touch audio obtained time.

Figure 14:
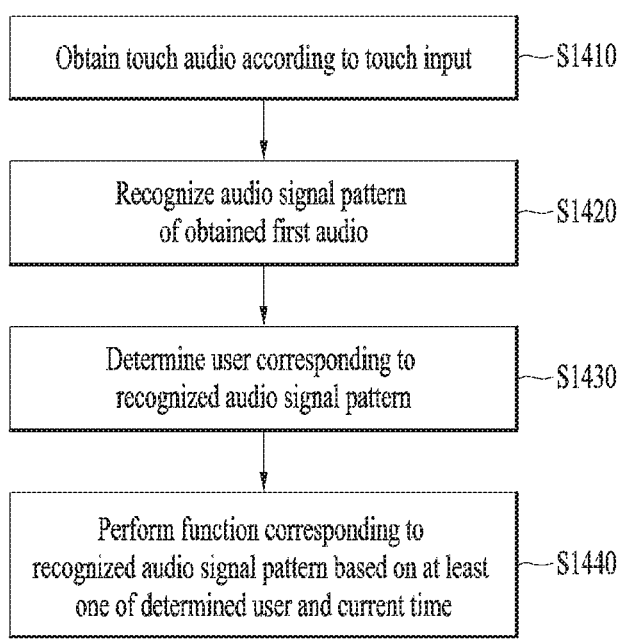
FIG. 14 is a flowchart for a method of operating an electronic device according to various embodiments of the present invention.

FIG. 14 is a flowchart for a method of operating an electronic device according to various embodiments of the present invention.

Referring to FIG. 14, the electronic device 200 can obtain a touch audio according to a touch input of touching the electronic device 200 through at least one microphone 220 [S1410]. The electronic device 200 can recognize an audio signal pattern of the obtained touch audio [S1420]. This is already mentioned in the foregoing description and its details shall be omitted from the following.

The electronic device 200 can determine a user corresponding to the recognized audio signal pattern [S1430].

For instance, based on an audio signal pattern according to each user's input and an audio signal pattern according to a voice of each user, the controller 280 of the electronic device 200 can determine a user corresponding to the recognized audio signal pattern. Moreover, the electronic device 200 obtains a sound related to a user's motion through the microphone 220 and may be able to determine a user corresponding to the recognized audio signal pattern by recognizing an audio signal pattern according to the obtained sound. For one example, the microphone 220 of the electronic device 200 obtains a sound related to a footstep sound of a user and is then able to determine a user based on an audio signal pattern according to the obtained sound.

Based on at least one of a determined user and a current time, the electronic device 200 can perform a function corresponding to the recognized audio signal pattern.

The electronic device 200 can check a current time at which the touch audio is obtained and is then able to perform a function corresponding to the recognized audio signal pattern based on the checked current time.

For instance, if a touch audio is obtained in the morning, the controller 280 of the electronic device 200 can output a morning greeting as a function corresponding to a recognized audio signal pattern. If a touch audio is obtained in the evening, the controller 280 of the electronic device 200 can output an evening greeting as a function corresponding to a recognized audio signal pattern.

Based on the determined user, the electronic device 200 can perform a function corresponding to the recognized audio signal pattern.

For instance, if a determined user is a father of a family, the controller 280 of the electronic device 200 can output information corresponding to father's interest. If a determined user is a son of a family, the controller 280 of the electronic device 200 can output information corresponding to son's interest.

Moreover, based on the determined user and the checked current time, the electronic device 200 may perform a function corresponding to a recognized audio pattern.

For instance, if a determined user is a father of a family and a current time is after a quitting time, the controller 280 of the electronic device 200 can output greeting according to leaving for the day.

For another instance, if a determined user is a son and a current time is before time for school, the controller 280 of the electronic device 200 can output greeting for school life.

The electronic device 200 according to various embodiments of the present invention may operate in voice recognition mode corresponding to a distance of an obtained audio. This is described as follows.

Figure 15:
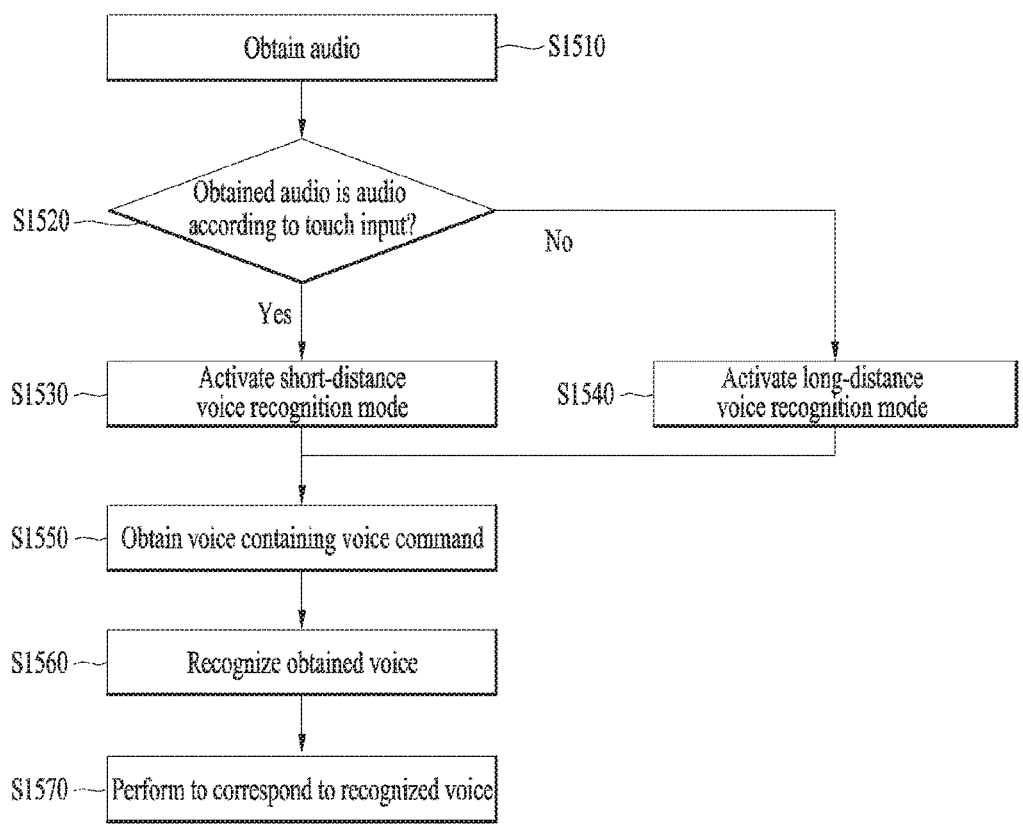
FIG. 15 is a flowchart for a method of operating an electronic device according to various embodiments of the present invention.

FIG. 15 is a flowchart for a method of operating an electronic device according to various embodiments of the present invention.

Referring to FIG. 15, the microphone 220 of the electronic device 200 can obtain an audio [S1510]. The electronic device 200 can determine whether the obtained audio is an audio according to a touch input of touching the electronic device 200 [S1520].

If the obtained audio is the audio according to the touch input, the electronic device 200 can activate a short-distance voice recognition mode [S1530].

For instance, if the obtained audio is the audio according to the touch input of touching the microphone 220, the electronic device 200 can activate a voice recognition mode for recognizing a voice in a short distance from the electronic device 200. For one example, the electronic device 200 can activate a voice recognition mode for recognizing a voice spoken within a distance of 1 m from the electronic device 200. Hence, the controller 180 can adjust a sound reception sensitivity of the microphone 220 to correspond to a short distance and is able to adjust sensitivity of a module related to a voice recognition. For one example, the controller 280 can adjust a voice processing for at least one of a background noise and a space reverberation included in an audio signal obtained by the microphone 220 and is able to send information related to a voice recognition module to a server (not shown in the drawing) through the wireless communication unit 210 to enable the voice recognition module of a voice recognition function to be switched to a short-distance recognition module.

If the obtained audio is not the audio according to the touch input, the electronic device 200 can activate the long-distance voice recognition module [S1540].

For instance, if the obtained audio is the audio according to the touch input of touching the microphone 220, the electronic device 200 can activate a voice recognition mode for recognizing a voice out of a predetermined distance from the electronic device 200. For one example, the electronic device 200 can activate a voice recognition mode for recognizing a voice spoken out of a distance of 1 m from the electronic device 200. Hence, the controller 180 can adjust a sound reception sensitivity of the microphone 220 to correspond to a long distance and is able to adjust sensitivity of a module related to a voice recognition. For one example, the controller 280 can adjust a voice processing for at least one of a background noise and a space reverberation included in an audio signal obtained by the microphone 220 and is able to send information related to a voice recognition module to a server (not shown in the drawing) through the wireless communication unit 210 to enable the voice recognition module of a voice recognition function to be switched to a long-distance recognition module.

Meanwhile, the above-mentioned reference distances of the short-distance and long-distance voice recognition modes are examples for the corresponding description only and can be variously set depending on selections made by a user or designer.

The electronic device 200 can obtain a voice including a voice command [S1550] and is able to recognize the obtained voice [S1560]. And, the electronic device 200 can perform a function corresponding to the recognized voice [S1570]. This is already mentioned in the foregoing description and its details shall be omitted from the following.

The electronic device 200 according to various embodiments of the present invention can be provided with a convexo-concave surface such as projections on a periphery of the microphone 220 and a material of the periphery of the microphone 220 may be different from that of other regions. And, the electronic device 200 is provided with different convexo-concave surfaces formed of different materials in predetermined directions of the periphery of the microphone 220, respectively, whereby audio signal patterns of the obtained audios can be distinguished from each other depending on a direction or pattern of a touch input to the microphone 220. This is described with reference to FIG. 16 and FIG. 17.

Figure 16:
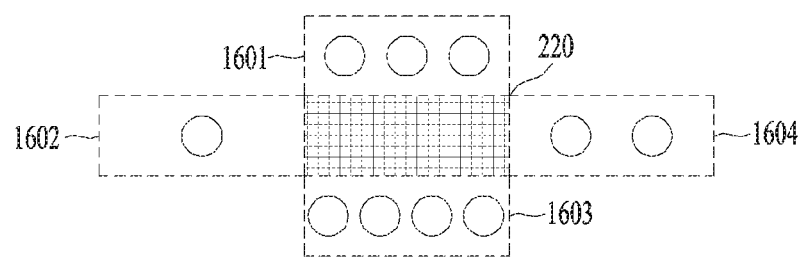
FIG. 16 is a diagram of projections around a microphone according to one embodiment of the present invention.

FIG. 16 is a diagram of projections around a microphone according to one embodiment of the present invention.

Referring to FIG. 16, a convexo-concave surface such as projections can be provided to a predetermined periphery of the microphone 220 of the electronic device 200. For one example, different numbers of projections can be provided to a periphery of the microphone 220 in top, bottom, right and left directions of the microphone 220, respectively. For instance, 3 projections are provided to a first region 1601 next to a top side of the microphone 220, 1 projection is provided to a second region 1602 next to a left side of the microphone 220, 4 projections are provided to a third region 1603 next to a bottom side of the microphone 220, and 2 projections are provided to a fourth region 1604 next to a right side of the microphone 220. Hence, an audio signal pattern of an audio obtained by the microphone 220 can be distinguished depending on a direction or pattern of an input of touching the microphone 220. For instance, since a touch input applied in left-to-right direction of the microphone 220 sequentially touches the 1 projection of the second region 1602 and the 2 projections of the fourth region 1604 or a touch input applied in right-to-left direction of the microphone 220 sequentially touches the 2 projection of the fourth region 1604 and the 1 projection of the second region 1602, an audio signal pattern of an audio according to each of the inputs can be distinguished. Moreover, a size of a projection provided to a periphery of the microphone 220 may vary according to a region or direction of the periphery of the microphone 220, and a projection-disposed location and direction vary as well.

Figure 17:
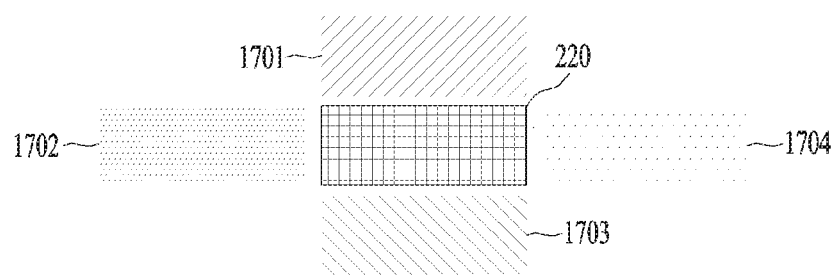
FIG. 17 is a diagram to show material around a microphone of an electronic device according to one embodiment of the present invention.

FIG. 17 is a diagram to show material around a microphone of an electronic device according to one embodiment of the present invention.

Referring to FIG. 17, regions formed of different materials can be provided to predetermined regions of a periphery of the microphone 220 of the electronic device 200, respectively. For one example, regions formed of different materials can be provided to a periphery of the microphone 220 in top, bottom, right and left directions of the microphone 220, respectively. For instance, a first region 1701 next to a top side of the microphone 220 can be formed of a first material, a second region 1702 next to a left side of the microphone 220 can be formed of a second material, a third region 1703 next to a bottom side of the microphone 220 can be formed of a third material, and a fourth region 1704 next to a right side of the microphone 220 can be formed of a fourth material. Hence, an audio signal pattern of an audio obtained by the microphone 220 can be distinguished depending on a direction or pattern of an input of touching the microphone 220. For instance, since a touch input applied in left-to-right direction of the microphone 220 sequentially touches the second material of the second region 1702 and the fourth material of the fourth region 1704 or a touch input applied in right-to-left direction of the microphone 220 sequentially touches the fourth material of the fourth region 1704 and the second material of the second region 1702, an audio signal pattern of an audio according to each of the inputs can be distinguished. Moreover, a material forming a partial region of the periphery of the microphone 220 may vary according to a region or direction of the periphery of the microphone 220, and a height of the case configuring the periphery of the microphone 220 may vary according to a region or direction of the periphery of the microphone 220.

The convexo-concave surfaces (e.g., projections) or the materials provided to the periphery of the microphone 220 can be provided differently to peripheries of a plurality of microphones, respectively. Hence, the electronic device 200 can distinguish an audio signal pattern of an obtained audio according to a direction or pattern of a touch input to at least one of a plurality of microphones depending on at least one of a convexo-concave surface and a material differently provided to a periphery of each of a plurality of the microphones. This is described in detail with reference to FIGS. 18 to 20.

Figure 18:
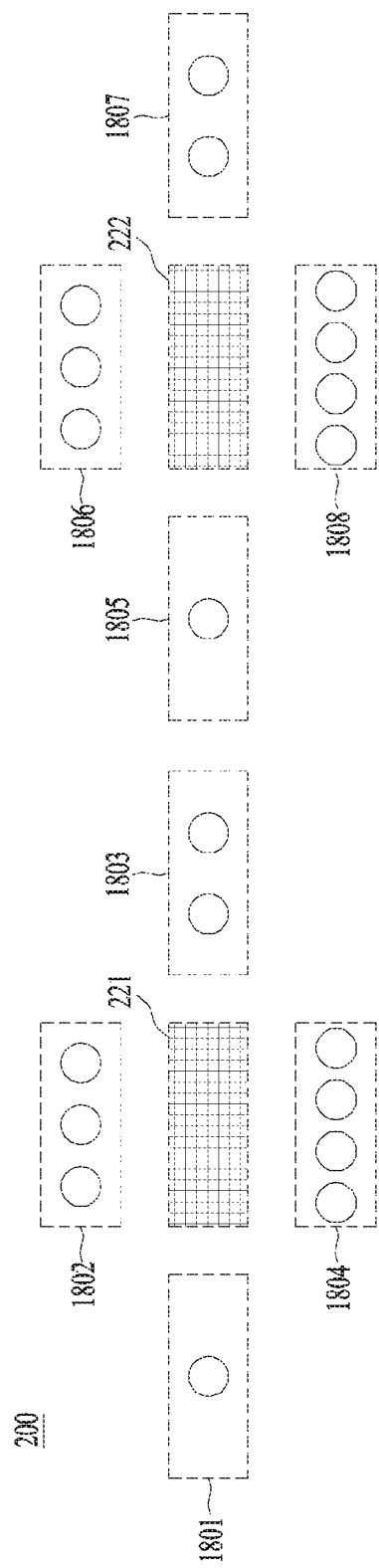
FIG. 18 is a diagram to show projections around a plurality of microphones according to various embodiments of the present invention.

FIG. 18 is a diagram to show projections around a plurality of microphones according to various embodiments of the present invention.

Referring to FIG. 18, the electronic device 200 can include a plurality of microphones such as a first microphone 221 and a second microphone 222. A convexo-concave surface such as projections can be provided to a predetermined region of a periphery of each of the first microphone 221 and the second microphone 222 of a plurality of the microphones. For one example, the different numbers of projections can be provided to the periphery of each of the first microphone 221 and the second microphone 222 in top, bottom, right and left directions, respectively. For instance, 1 projection is provided to a first region 1801 next to a left side of the first microphone 221, 3 projections are provided to a second region 1802 next to a top side of the first microphone 221, 2 projections are provided to a third region 1803 next to a right side of the first microphone 221, and 4 projections are provided to a fourth region 1804 next to a bottom side of the first microphone 221. 1 projection is provided to a fifth region 1805 next to a left side of the second microphone 222, 3 projections are provided to a sixth region 1806 next to a top side of the second microphone 222, 2 projections are provided to a seventh region 1807 next to a right side of the second microphone 222, and 4 projections are provided to an eighth region 1808 next to a bottom side of the second microphone 222. In this case, each of the third region 1803 and the fifth region 1805 may be a predetermined region between the first microphone 221 and the second microphone 222. According to a direction or pattern of an input of touching at least one of the first microphone 221 and the second microphone 222 of a plurality of the microphones, an audio signal pattern of an audio obtained by at least one of a plurality of the microphones can be distinguished. For instance, as a touch input applied in a direction from a left side of the first microphone 221 to a right side of the second microphone 222 sequentially comes in contacts with the 1 projection of the first region 1801, the 2 projections of the third region 1803, the 1 projection of the fifth region 1805, and the 2 projections of the seventh region 1807, the first microphone 221 and the second microphone 222 can obtain an audio of the touch input according to the corresponding contacts. For another instance, as a touch input applied in a direction from a right side of the second microphone 222 to a left side of the first microphone 221 sequentially comes in contacts with the 2 projections of the seventh region 1807, the 1 projection of the fifth region 1805, the 2 projections of the third region 1803, and the 1 projection of the first region 1801, the first microphone 221 and the second microphone 222 can obtain an audio of the touch input according to the corresponding contacts. Thus, according to a plurality of projections provided to a periphery of each of a plurality of microphones, the electronic device 200 can obtain an audio distinguished for a touch input to the first microphone 221 and the second microphone 222 in a different direction.

Figure 19:
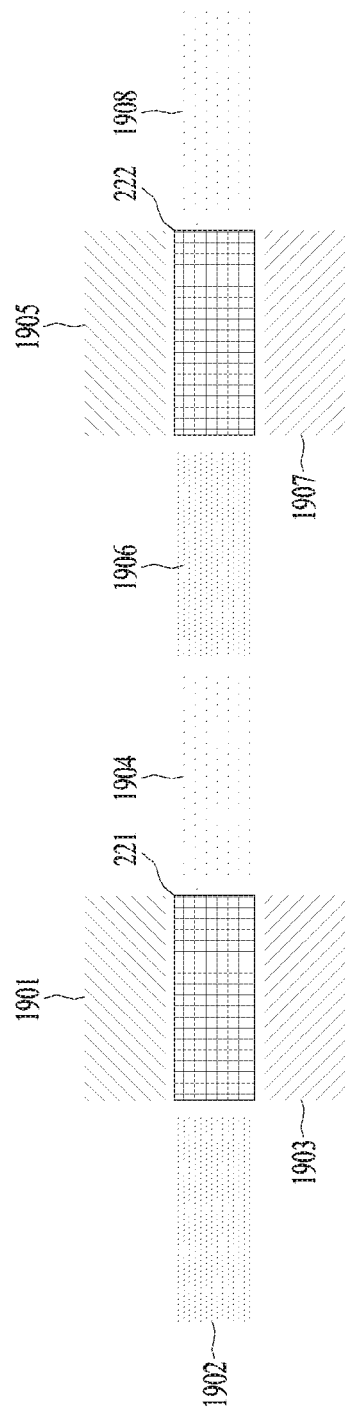
FIG. 19 is a diagram to show materials of peripheries of a plurality of microphones according to various embodiments of the present invention.

FIG. 19 is a diagram to show materials of peripheries of a plurality of microphones according to various embodiments of the present invention.

Referring to FIG. 19, the electronic device 200 can include a plurality of microphones such as a first microphone 221 and a second microphone 222. Regions formed of different materials can be provided to predetermined regions of a periphery of each of the first microphone 221 and the second microphone 222 of a plurality of the microphones. For one example, regions formed of different materials can be provided to the periphery of each of the first microphone 221 and the second microphone 222 in top, bottom, right and left directions, respectively. For instance, a first region 1901 next to a top side of the first microphone 221 can be formed of a first material, a second region 1902 next to a left side of the first microphone 221 can be formed of a second material, a third region 1903 next to a bottom side of the first microphone 221 can be formed of a third material, and a fourth region 1904 next to a right side of the first microphone 221 can be formed of a fourth material. A fifth region 1905 next to a top side of the second microphone 222 can be formed of the first material, a sixth region 1906 next to a left side of the second microphone 222 can be formed of the second material, a seventh region 1907 next to a bottom side of the second microphone 222 can be formed of the third material, and an eighth region 1908 next to a right side of the second microphone 222 can be formed of the fourth material. In this case, each of the fourth region 1904 and the sixth region 1906 may be a predetermined region between the first microphone 221 and the second microphone 222. According to a direction or pattern of an input of touching at least one of the first microphone 221 and the second microphone 222 of a plurality of the microphones, an audio signal pattern of an audio obtained by at least one of a plurality of the microphones can be distinguished. For instance, as a touch input applied in a direction from a left side of the first microphone 221 to a right side of the second microphone 222 sequentially comes in contacts with the second material of the second region 1902, the fourth material of the fourth region 1904, the second material of the sixth region 1906 and the fourth material of the eight region 1908, the first microphone 221 and the second microphone 222 can obtain an audio of the touch input according to the corresponding contacts. For another instance, as a touch input applied in a direction from a right side of the second microphone 222 to a left side of the first microphone 221 sequentially comes in contacts with the fourth material of the eighth region 1908, the second material of the sixth region 1906, the fourth material of the fourth region 1904, and the second material of the second region 1902, the first microphone 221 and the second microphone 222 can obtain an audio of the touch input according to the corresponding contacts. Thus, according to the materials configuring a periphery of each of a plurality of microphones, the electronic device 200 can obtain an audio distinguished for a touch input to the first microphone 221 and the second microphone 222 in a different direction.

Figure 20:
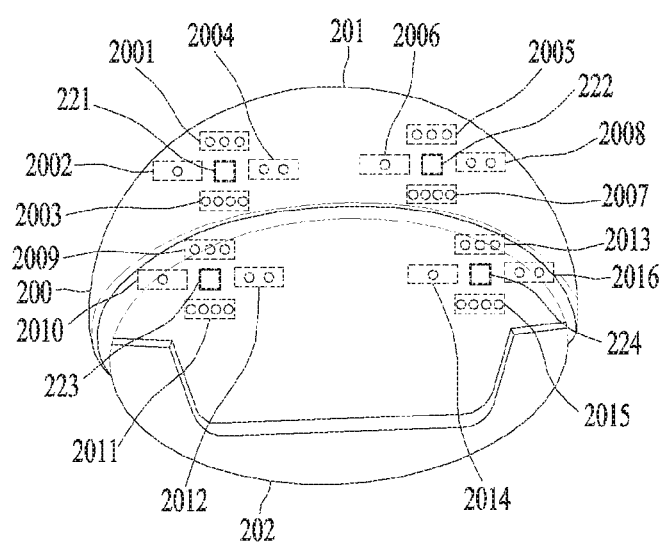
FIG. 20 is a diagram of an electronic device according to various embodiments of the present invention.

FIG. 20 is a diagram of an electronic device according to various embodiments of the present invention.

Referring to FIG. 20, a first microphone 221 and a second microphone 222 can be disposed on a top side of a first case 201 of the electronic device 200. A third microphone 223 and a fourth microphone 224 can be disposed on a front side of the first case 201. Hence, the first microphone 221 and the second microphone 222 can correspond to a top direction of the electronic device 200, while the third microphone 223 and the fourth microphone 224 correspond to a front direction of the electronic device 200. The different numbers of projections can be provided in top, bottom, right and left directions of a periphery of each of the first to fourth microphones 221 to 224 of a plurality of microphones, respectively. For instance, in each of the first to fourth microphones 221 to 224, 1 projection is provided to a left side, 3 projections are provided to a top side, 2 projections are provided to a right side, and 4 projections are provided to a bottom side. Regions of different materials can be provided in top, bottom, right and left directions of a periphery of each of the first to fourth microphones 221 to 224 of a plurality of the microphones, respectively. For instance, in each of the first to fourth microphones 221 to 224, a top side region 2001/2005/2009/2013 is formed of a first material, a left side region 2002/2006/2010/2014 is formed of a second material, a right side region 2004/2008/2012/2016 is formed of a third material, and a bottom side region 2003/2007/2011/2015 is formed of a fourth material. Hence, it is able to distinguish an audio signal pattern of an audio obtained according to a touch input to at least one of a plurality of the microphones 221 to 224 of the electronic device 200. This is already mentioned in the foregoing description and its details shall be omitted from the following. The description of the projections or materials of the periphery of each of a plurality of the microphones 221 to 224 of the electronic device 200 is provided as one example. And, at least one of the different numbers of the projections and the different materials can be provided to the periphery of each of a plurality of the microphones 221 to 224. The projections formed of different materials may be provided to the periphery of each of a plurality of the microphones 221 to 224, or the different number of projections formed of different materials may be provided to the periphery of each of a plurality of the microphones 221 to 224.

As mentioned in the foregoing description, in the electronic device 200 according to various embodiments of the present invention, a convexo-concave surface (e.g., projections) or a subject matter (e.g., material, substance, etc.) or the like can be provided to a prescribed region of at least one case (e.g., frame, housing, cover, etc.) configuring an exterior of the electronic device 200 as well as to a predetermined region of the periphery of the microphone 220. For instance, at least one of a convexo-concave surface and a material different from that of another region can be provided to a region of the electronic device 200, with which a contact such as a user's touch input is expected. For one example, at least one of a convexo-concave surface and a material different from that of another region can be provided to a partial region of a lateral or rear side of the electronic device 200. Hence, the microphone 220 of the electronic device 200 can obtain an audio according to a touch input to a projection or material provided to a partial region of at least one case configuring an exterior of the electronic device 200 and is able to distinguish the obtained audio from another audio obtained from another region. A convexo-concave surface or a material providable to a partial region of at least one case configuring an exterior of the electronic device 200 can be provided in the same color of another region with the same gloss.

In the electronic device 200 according to various embodiments of the present invention, a designing configuration for configuring an exterior or shape of the electronic device 200 can play a role as the convexo-concave surface like the projections. And, a material or substance of the designing configuration for configuring the exterior or shape of the electronic device 200 can be configured with a material or substance different from that of another region. For instance, if the electronic device 200 has a human or animal shape, the convexo-concave surface like the projections can be provided to a specific part (e.g., human ear, animal ear, etc.) or the specific part such as the human ear or the animal ear may be configured with a material different from that of another part. As a designing configuration for configuring an exterior or shape of the electronic device 200, the convexo-concave surface like the projections can be provided to some components for decoration and a material of the designing configuration may be different from that of other parts.

Thus, in the electronic device 200 according to the present invention, since a physical configuration (e.g., a convexo-concave surface, material, etc.) formed near the microphone 220 can be provided in a manner of differing in a predetermined region or direction of a periphery of the microphone 220, it is able to determine a location, touch pattern, touch strength, touch duration time and touch periodicity of a touch input to the microphone 220.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the electronic device.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device, comprising:
a plurality of microphones receiving audio input; and
a processor operably coupled with the plurality of the microphones,
wherein:
when the received audio input is a first audio input caused by a touch input received at the electronic device, the processor determines at least one of a location, a touch pattern, a touch strength, a touch duration time, or a touch periodicity of the touch input, and activates a short-distance voice recognition mode for receiving a voice input originated within a predetermined distance from the electronic device; and
when the received audio input is a second audio input that is not caused by the touch input, the processor activates a long-distance voice recognition mode for receiving a voice input originated farther than the predetermined distance.

2. The electronic device of claim 1, wherein the processor recognizes an audio signal pattern of the received audio input and performs an operation corresponding to the recognized audio signal pattern.

3. The electronic device of claim 2, wherein the processor determines a user corresponding to the recognized audio signal pattern and performs the operation corresponding to the recognized audio signal pattern based on the determined user.

4. The electronic device of claim 2, wherein the processor checks time of receiving the audio input and performs the operation corresponding to the recognized audio signal pattern based on the checked time.

5. The electronic device of claim 1, wherein the touch input is received via at least one of the plurality of microphones.

6. The electronic device of claim 1, wherein the touch input is received via a case of the electronic device.

7. The electronic device of claim 1, wherein the touch input comprises tapping a case of the electronic device.

8. The electronic device of claim 7, wherein the tapping is received on a portion of the case at which at least one of the plurality of microphones is located.

9. The electronic device of claim 1, wherein a sound reception sensitivity is adjusted differently for the short-distance voice recognition mode and the long-distance voice recognition mode.

10. A method of operating an electronic device including a plurality of microphones, the method comprising:
    determining whether an audio input received via the plurality of microphones is a first audio input caused by a touch input received at the electronic device or a second audio input that is not caused by the touch input;
    when the received audio input is the first audio input, determining at least one of a location, a touch pattern, a touch strength, a touch duration time, or a touch periodicity of the touch input and, activating a short-distance voice recognition mode for receiving a voice input originated within a predetermined distance from the electronic device; and
    when the received audio input is the second audio input, activating a long-distance voice recognition mode for receiving a voice input originated farther than the predetermined distance.

11. The method of claim 10, further comprising:
    recognizing an audio signal pattern of the received audio input; and
    performing an operation corresponding to the recognized audio signal pattern.

12. The method of claim 11, further comprising:
    determining a user corresponding to the recognized audio signal pattern; and
    performing the operation corresponding to the recognized audio signal pattern based on the determined user.

13. The method of claim 11, further comprising:
    checking a time of receiving the audio input; and
    performing the operation corresponding to the recognized audio signal pattern based on the checked time.

* * * * *